(12) United States Patent
Downs et al.

(10) Patent No.: US 6,487,556 B1
(45) Date of Patent: Nov. 26, 2002

(54) METHOD AND SYSTEM FOR PROVIDING AN ASSOCIATIVE DATASTORE WITHIN A DATA PROCESSING SYSTEM

(75) Inventors: Carl Benjamin Downs, Austin, TX (US); Mohinder Pal Singh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/215,908

(22) Filed: Dec. 18, 1998

(51) Int. Cl.[7] .............................................. G06F 17/00
(52) U.S. Cl. ........................ 707/101; 707/102; 707/103
(58) Field of Search ........................... 707/3, 4, 5, 101, 707/102, 104, 201, 103

(56) References Cited

U.S. PATENT DOCUMENTS

| | | | | |
|---|---|---|---|---|
| 4,658,147 A | * | 4/1987 | Eldering ...................... 250/566 |
| 5,737,591 A | * | 4/1998 | Kaplan et al. ............... 395/601 |
| 5,948,063 A | * | 9/1999 | Cooper et al. .............. 709/223 |
| 5,953,017 A | * | 9/1999 | Beach et al. ................ 345/440 |
| 6,039,245 A | * | 3/2000 | Symonds et al. ........... 235/379 |
| 6,097,382 A | * | 8/2000 | Rosen et al. ................ 345/326 |
| 6,151,584 A | * | 11/2000 | Papierniak et al. ........... 705/10 |
| 6,263,341 B1 | * | 7/2001 | Smiley ........................ 707/103 |

* cited by examiner

Primary Examiner—James P. Trammell
Assistant Examiner—Mary Wang
(74) Attorney, Agent, or Firm—Duke W. Yee; Jeffrey S. LaBaw; Christopher P. O'Hagan

(57) ABSTRACT

A computer system implements a datastore for a plurality of generic terminal objects. Terminal objects are related to zero or more association objects that represent a relation between a plurality of terminal objects. An association object is typed according to the relationship being represented between the terminal objects. An association object has a state value corresponding to a state of the relation between the plurality of terminal objects. An association object also has a role object for each of the plurality of terminal objects being related to the association object. An association object may also represent the dynamic state of a single terminal object. A role object represents a relation between the association object and a terminal object. The role object is typed according to the relationship being represented between the associated object and the terminal object, and the role type is unique amongst the role objects within the association object. The datastore may store the association object and the terminal objects in a relational database in a computer-readable medium.

19 Claims, 34 Drawing Sheets

EXAMPLE OF JAVA FILES FOR AN ASSOCIATIVE DATASTORE

```java
//-----DSasso.jav-----
package com.tivoli.ds;

import com.tivoli.ampi.AMPTopLevel;
import java.util.*;

public class DSAsso extends DSElement
{
   //---------------------------------------------
   // Public Constructors
   //---------------------------------------------
   public DSAsso ()
   {
     super (DS_ASSO_RESOURCE_PREFIX);
   } public DSAsso (String type)
   {
     super (DS_ASSO_RESOURCE_PREFIX);
              setProperty (DS_TYPE,type);
   } public DSAsso (String type, String state)
   {
     super (DS_ASSO_RESOURCE_PREFIX);
              setProperty (DS_TYPE,type);
              setProperty (DS_ASSO_STATE, state);
   }
```

FROM FIG. 10A

```
//------------------------------------------------
// Public Methods
//------------------------------------------------

/**
set/get the association state. At present, state is
maintained as a simple String. We'll change this to a
derivative of DSState.
*/ public void setState (String state)
{
                setProperty (DS_ASSO_STATE, state);
} public String getState ()
{
    return getProperty (DS_ASSO_STATE);
}
//------------------------------------------------
// Private Constants
//------------------------------------------------
private static final String DS_ASSO_RESOURCE_PREFIX="ds_assoc";
public static final String DS_ASSO_STATE="state";

//------------------------------------------------
//Private Instance Variables
//------------------------------------------------
/**
Associations are typed
*/

String type;

/** association state is tracked by a simple state machine object
that contains all possible states and the allowable transitions.
At present, we are using a simple String.
*/
//DSState state=new DSState();
String state;
}
```

FIG. 10B

EXAMPLE OF JAVA FILES FOR AN ASSOCIATIVE DATASTORE

```java
// ----- DSccmd.jav -----
package com.tivoli.ds;

import java.io.*;
import com.tivoli.ampi.AMPTopLevel;
import com.tivoli.cams.*;

public class DSCCmd extends DSElement
{
    //---------------------------------------------
    //Public Constructors
    //---------------------------------------------
    public DSCCmd (CAMSInterface ci, String refGuid) throws Exception
    {
        super (DS_CCMD_RESOURCE_PREFIX);

ByteArrayOutputStream baos = new ByteArrayOutputStream();
        ci.save(baos);
        setProperty(DS_CCMD_SERIALIZED, baos.toString());

if(refGuid != null)
                        if(refGuid.length() != 0)
                setProperty(DS_CCMD_REFGUID, refGuid);
    }
    //---------------------------------------------
    //Private Constants
    //---------------------------------------------
    private static final String DS_CCMD_RESOURCE_PREFIX = "ds_ccmd";
    public static final String DS_CCMD_SERIALIZED = "serializedCmd";
    public static final String DS_CCMD_REFGUID = "referenceGuid";
}

//-----DScommand.jav-----
package com.tivoli.ds;

import com.tivoli.cams.*;
import java.util.*;

public class DSCommand extends CAMSCommand
{
```

FROM FIG. 11A

```
//----------------------------------------------------
//Public Constructors
//---------------------------------------------------- public DSCommand () throws Exception
{
  super (COMMAND_TYPE, COMMAND_VERSION);
  setProperty (DS_TYPE, DS_UNKNOWN);
}
//----------------------------------------------------
//Public Methods
//----------------------------------------------------
public void setProperty(String name, String value)
{
try {
        super.setProperty(name, value);
        }
catch (Exception ex)
        {
        DSUtil.error("Name = " + name + "; Value = " + value
                +";Message; " + ex.getMessage());
        }
} public void designateAsCreate ()
{
   setProperty (DS_TYPE, DS_CREATE);
}
```

FIG. 11B

EXAMPLE OF JAVA FILES FOR AN ASSOCIATIVE DATASTORE

```java
public boolean isCreate ()
{
   return (getProperty (DS_TYPE) == DS_CREATE);
} public void designateAsQuery ()
{
   setProperty (DS_TYPE, DS_QUERY);
} public boolean isQuery ()
{
   return (getProperty (DS_TYPE) == DS_QUERY);
} public void designateAsUpdate()
{
   setProperty (DS_TYPE, DS_UPDATE);
} public boolean isUpdate ()
{
   return (getProperty (DS_TYPE) == DS_UPDATE);
} public void designateAsDelete ()
{
   setProperty (DS_TYPE, DS_DELETE);
} public boolean isDelete ()
{
```

FROM FIG. 12A

```
    return (getProperty (DS_TYPE) == DS_DELETE);
} public void designateAsStartTrans ()
{
    setProperty (DS_TYPE, DS_TRANS_START);
} public boolean isStartTrans ()
{
    return (getProperty (DS_TYPE) == DS_TRANS_START);
} public void designateAsCommitTrans ()
{
    setProperty (DS_TYPE, DS_TRANS_COMMIT);
} public boolean isCommitTrans ()
{
    return (getProperty (DS_TYPE) == DS_TRANS_COMMIT);
} public void designateAsRollbackTrans ()
{
    setProperty (DS_TYPE, DS_TRANS_ROLLBACK);
} public boolean isRollbackTrans ()
{
    return (getProperty (DS_TYPE) == DS_TRANS_ROLLBACK);
} public String getType()
{
    return (getProperty (DS_TYPE));
}
```

*FIG. 12B*

EXAMPLE OF JAVA FILES FOR AN ASSOCIATIVE DATASTORE

```java
  public Enumeration getTerminals ()
  {
    DSTerm example = new DSTerm();
    return getListItems (example);
  } public Enumeration getAssoc ()
  {
    DSAsso example = new DSAsso();
    return getListItems (example);
  }
  //------------------------------------------
  //Private Constants
  //------------------------------------------
  public final static String COMMAND_TYPE = "ds_cmd";
  public final static String COMMAND_VERSION = "1.0";

private final static String DS_TYPE ="type";
  private final static String DS_UNKNOWN = "unknown";
  private final static String DS_CREATE = "create";
  private final static String DS_DELETE = "delete";
  private final static String DS_QUERY = "query";
  private final static String DS_UPDATE = "update";
  private final static String DS_TRANS_START = "start";
  private final static String DS_TRANS_COMMIT = "commit";
  private final static String DS_TRANS_ROLLBACK = "rollback";
}

// ----- DSelemen.jav ----
package com.tivoli.ds;

import com.tivoli.ampi.AMPTopLevel;
import com.tivoli.ampi.AMPPropertySet;
import java.util.*;

public abstract class DSElement extends AMPToplevel
{
```

FROM FIG. 13A

```
//---------------------------------------------------
//Public Constants
//---------------------------------------------------
public static final int NEW_PROP_SET = 0;
public static final int OVERWRITE_PROP = 1;
public static final int NO_OVERWRITE_PROP = 2;
public static final int AND_PROPS = 0;
public static final int OR_PROPS = 1;
public static final String DS_TYPE = "ds_type";

//---------------------------------------------------
// Public Constructors
//---------------------------------------------------
public DSElement (String resource_prefix)
{
  super (resource_prefix);

//set a unique guid
  String newGUID = generateNewGUID();
  try {
      setGUID(newGUID);
      }
  catch (Exception ex)
      {
      DSUtil.error("DSElement: Constructor: " + ex.getMessage());
      }
}
```

FIG. 13B

EXAMPLE OF JAVA FILES FOR AN ASSOCIATIVE DATASTORE

```
//---------------------------------------------
//Public Methods
//--------------------------------------------- public void setProperty(String name, String value)
{
   try    {
           super.setProperty(name, value);
           }
   catch (Exception ex)
           {
           DSUtil.error("DSElement:setProperty:" + ex.getMessage());
           }
}
public void setType (String type)
{
setProperty (DS_TYPE, type);
} public String getType ()
{
   return getProperty (DS_TYPE);
} public Hashtable getContents ()
{
   return (Hashtable) getRootProperties();
}
```

FROM FIG. 14A

```java
public void setContents (Hashtable newProps)
{
  String key = null;
  String value = null;
  Properties currentProps = getRootProperties();
  currentProps.clear();

Enumeration e = newProps.keys();

while (e.hasMoreElements())
  {
    key = (String) e.nextElement();
    value = (String) newProps.get (key);
    currentProps.put (key, value);
  }
} public static String generateNewGUID()
{
              if (rand == null)          // initialize it once
                      rand = new Random (System.currentTimeMillis());
  Integer value = new Integer (rand.nextInt());
  return value.toString();
}
// ----------------------------------------------------------------
// Private Instance Variables
//-----------------------------------------------------------------
          static Random rand = null;

EXAMPLE OF JAVA FILES FOR AN ASSOCIATIVE DATASTORE

```java
//-----DSrole.jav---
package com.tivoli.ds;

import com.tivoli.ampi.AMPTopLevel;

public class DSRole extends DSElement
{
  // ------------------------------
  //Public Constructors
  // ------------------------------
  public DSRole (String type, DSTerm term)
  {
    super (DS_ROLE_RESOURCE_PREFIX);
        setRoleProps(type, term.getGUID());
  } public DSRole (String type, String termGuid)
  {
    super (DS_ROLE_RESOURCE_PREFIX);
        setRoleProps(type, termGuid);
  }

// ------------------------------------
  // Public Methods
  //------------------------------------- public String getTerminalGUID ()
  {
    return getProperty (DS_ROLE_TERMINAL_REFERENCE);
  } public void setTerminalGUID (DSTerm dst)
  {
    setProperty (DS_ROLE_TERMINAL_REFERENCE,dst.getGUID());
  }
```

FROM FIG. 15A

```java
public void setBlocking ()
{
        String toS = String.valueOf(true);
                setProperty(DS_ROLE_CONDITION, toS);
} public void clearBlocking ()
{
        String toS = String.valueOf(false);
                setProperty(DS_ROLE_CONDITION, toS);
} public boolean isBlocking ()
{
        Boolean cond = new Boolean(getProperty(DS_ROLE_CONDITION));
        return cond.booleanValue();
}
// ---------------------------------------------
// Private Constants
// ---------------------------------------------
private static final String DS_ROLE_RESOURCE_PREFIX = "DS ROLE";
public static final String DS_ROLE_TERMINAL_REFERENCE = "DS TERM REF";
public static final String DS_ROLE_CONDITION = "condition";

// ---------------------------------------------
// Private Methods
// ---------------------------------------------
private void setRoleProps(String type, String termGuid)
        {
        setProperty (DS_TYPE, type);
        setProperty (DS_ROLE_TERMINAL_REFERENCE, termGuid);
    clearBlocking();
        }
}
```

*FIG. 15B*

EXAMPLE OF JAVA FILES FOR AN ASSOCIATIVE DATASTORE

```java
//-----DSterm.jav----
package com.tivoli.ds;

import com.tivoli.ampi.*;
import java.util.Enumeration;

/**

This class is part of the datastore (DS) interface.
The DataStore definitions define how data is exchanged
between the AppManager and the physical database.

This class defines a 'terminal' object. Terminals are
base objects that can participate in an Association.

Terminal properties:

-may be connected to 0..N Associations
-can obtain the list of current Associations
-can determine the state of any Association
-control blocking conditions with respect to Associations

*/ public class DSTerm extends DSElement
{
// ------------------------------------------------
//Public Constructors
// ------------------------------------------------
```

FROM FIG. 16A

```java
public DSTerm ()
{
   super (DS_TERMINAL_RESOURCE_PREFIX);
}

// -----------------------------------------
//Private Constants
// -----------------------------------------
private static final String DS_TERMINAL_RESOURCE_PREFIX = "ds_term";

}

//-----DSutil.jav----
package com.tivoli.ds;

import java.util.*;
import com.tivoli.ampi.*;
import com.tivoli.cams.*;
import com.tivoli.ds.db.*;

public abstract class DSUtil {

//-----------------------------------------
// Public Static Methods
// -----------------------------------------
public static final void error(String str)
       {
       System.err.println("********\nERROR (DS): " + str + "\n********");
       } public static final void debug(String str)
       {
       if(Debug)
              System.err.println("DEBUG (DS): " + str);
       } public static final void setDebug(boolean flag)
       {
       Debug = flag;
       }
```

FIG. 16B

EXAMPLE OF JAVA FILES FOR AN ASSOCIATIVE DATASTORE

```java
public static final boolean getDebug()
    {
    return Debug;
    } public static void ampitods(AMPTopLevel atl, DSCommand dsc, DSTerm parent)
throws Exception
    {
            Enumeration en = atl.getItems();
            DSTerm child = new DSTerm();
            try
                {
                while ( en.hasMoreElements())
                    {
                        Object tmpatl = (Object) en.nextElement();
                        if (tmpatl instanceof AMPPropertySet)
                            {
                                // we don't currently need to do anything with this!
                                // setDSAssoc(parent, child, (AMPItem) tmpatl, dsc, "describes");
                            }
                        else ampitods ( (AMPTopLevel) tmpatl, dsc, child );
                    }
                setDSAssoc(parent, child, atl, dsc, "describes");
                }
            catch (Exception e)
                {
                    System.out.println("Error in ampitods " + e.getMessage());

}
    }
public static void setDSAssoc(DSTerm parent, DSTerm child, AMPTopLevel atl,
                                    DSCommand dsCmd, String assocType)
throws Exception
```

FROM FIG. 17A

```
        }
        DSAsso dsa = new DSAsso();
        dsa.setType(assocType);
        DSRole dsrp = new DSRole"parent", parent);
        DSRole dsrc = new DSRole("child", child);
        dsrp.setProperty("parent", parent.getGUID());
        dsrp.setProperty("association", dsa.getGUID());
        dsrc.setProperty("child", child.getGUID());
        dsrc.setProperty("association", dsa.getGUID());
        dsa.addItem(dsrp);
        dsa.addItem(dsrc);
        Enumeration en = atl.getRootProperties().propertyNames();
        while (en.hasMoreElements())
        {
                String key = (String) en.nextElement();
                String value = atl.getProperty(key);
                if (! value.equals(""))
                        child.setProperty(key,value);
        }
        child.setProperty("ds_type",atl.getClass().getName());
        dsCmd.addItem(child);
        dsCmd.addItem(parent);
        dsCmd.addItem(dsa);
    } public static void cmdtods(AMPTopLevel currentCmd, DSCommand dsCmd,
                                            DSTerm parent)
        throws Exception
    {
        // this routine will take a cams command and map it
        // to DSTerms, DSAsso and DSRoles.
        Enumeration en = currentCmd.getItems();
        DSTerm child = new DSTerm();
```

FIG. 17B

EXAMPLE OF JAVA FILES FOR AN ASSOCIATIVE DATASTORE

```java
        try
        {
            while ( en.hasMoreElements() )
            {
                Object tmpatl = (Object) en.nextElement() ;
                if (tmpatl instanceof AMPPropertySet )
                {
                    //no need to save AMPPropertySet
                    //atltodsterm(parent, child, (AMPItem) tmpatl, dsCmd);
                }
                else
                    cmdtods ((AMPTopLevel) tmpatl, dsCmd, child );
            }
            atltodsterm(parent, child, currentCmd, dsCmd);
        }
        catch (Exception e)
        {
            System.out.println("Error in cmdtods " + e.getMessage());
        }
    }
public static void atltodsterm(DSTerm parent, DSTerm child,
        AMPTopLevel atl, DSCommand dsCmd)
    throws Exception
    {
        DSAsso dsa = new DSAsso();
        dsa.setType("isSubCmd");

DSRole dsrp = new DSRole("parent", parent);
        DSRole dsrc = new DSRole("child", child);

dsa.addItem(dsrp);
        dsa.addItem(dsrc);
        Enumeration en = atl.getRootProperties().propertyNames();
        while (en.hasMoreElements())
```

FROM FIG. 18A

```
        }
              String key = (String) en.nextElement();
              String value = atl.getProperty(key);
              if (! value.equals(""))
                  child.setProperty(key,value);
        }
        child.setProperty("ds_type",atl.getClass().getName());
        dsCmd.addItem(child);
        dsCmd.addItem(dsa);
}

/**
takes two commands and creates a subcommand association between them
the state is passed in
*/
public static void createSubCommand(DSCommand dsCmd, CAMSCommand parent_cmd,
CAMSCommand child_cmd)
        throws Exception
        {
              DSTerm parent = new DSTerm();
              DSTerm child = new DSTerm();
              DSAsso dsa = new DSAsso();
              dsa.setType("subcommand");
              DSRole dsrp = new DSRole("parent", parent);
              DSRole dsrc = new DSRole("child", child);

dsa.addItem(dsrp);
              dsa.addItem(dsrc);
              Enumeration en = parent_cmd.getRootProperties().propertyNames();
              while (en.hasMoreElements())
              {
                    String key = (String) en.nextElement();
                    String value = parent_cmd.getProperty(key);
                    if (! value.equals(""))
                        parent.setProperty(key,value);
              }
```

*FIG. 18B*

EXAMPLE OF JAVA FILES FOR AN ASSOCIATIVE DATASTORE

```java
        parent.setProperty("ds_type",parent_cmd.getClass().getName());
        Enumeration en2 = child_cmd.getRootProperties().propertyNames();
        while (en2.hasMoreElements())
        {
              String key = (String) en2.nextElement();
              String value = child_cmd.getProperty(key);
              if (! value.equals(""))
                  child.setProperty(key,value);
        }
        child.setProperty("ds_type",child_cmd.getClass().getName());
        dsCmd.addItem(parent);
        dsCmd.addItem(child);
        dsCmd.addItem(dsa);

}
  public static DSCommand queryToCmd(DB db, String guid, int depth) throws Exception {
     return queryToCmd(db, guid, depth, null);
  }

/**
  Locates the DSElement object (DSTerm or DSAsso) in the data store with
  the specified GUID and walks the graph structure outward to the specified
  depth, returning all the connected DSElement objects.
  */
  public static DSCommand queryToCmd(DB db, String guid, int depth,
     Vector badElems) throws Exception         {
     DSCommand dsc = null;
     Hashtable termCache = new Hashtable();
     Hashtable assoCache = new Hashtable();
     Hashtable roleCache = new Hashtable();
     if (db.isTerminal(guid)) {
```

FROM FIG. 19A

```
      dsc = new DSCommand();
      DSTerm term = constructTerm(db, guid);
      dsc.addItem(term);
      termCache.put(guid, term);
      if (depth > 0)
         walkAssociations(term, null, depth-1, db, dsc,
            termCache, assoCache, roleCache, badElems);
   }
   else if (db.isAssociation(guid)) {
      dsc = new DSCommand();
      DSAsso asso = constructAsso(db, guid);
      dsc.addItem(asso);
      assoCache.put(guid, asso);
      if (depth > 0)
         walkTerminals(asso, null, depth-1, db, dsc,
            termCache, assoCache, roleCache, badElems);
   }
   return dsc;
} public static DSCommand queryToCmd(DB db, DSElement elem, int depth) throws Exception {
   return queryToCmd(db, elem, depth, null);
}

/**
Locates the specified DSElement object (DSTerm or DSAsso) in the data store
and walks the graph structure outward to the specified
depth, returning all the connected DSElement objects.
*/
public static DSCommand queryToCmd(DB db, DSElement elem, int depth,
   Vector badElems) throws Exception {
   DSCommand dsc = null;
   Hashtable termCache = new Hashtable();
   Hashtable assoCache = new Hashtable();
   Hashtable roleCache = new Hashtable();
   if (elem instanceof DSTerm) {
      dsc = new DSCommand();
      dsc.addItem(elem);
```

FIG. 19B

EXAMPLE OF JAVA FILES FOR AN ASSOCIATIVE DATASTORE

```java
      termCache.put(elem.getGUID(), elem);
      if (depth > 0)
        walkAssociations((DSTerm)elem, null, depth-1, db, dsc,
          termCache, assoCache, roleCache, badElems);
    }
    else if (elem instanceof DSAsso) {
      dsc = new DSCommand();
      dsc.addItem(elem);
      assoCache.put(elem.getGUID(), elem);
      if (depth > 0)
        walkTerminals((DSAsso)elem, null, depth-1, db, dsc,
          termCache, assoCache, roleCache, badElems);
    }
    return dsc;
  }

/**
  Creates an instance of a DSElement object and populates it with the
  properties found in the data store with the specified GUID.
  */
  public static DSElement constructElement(DB db, String guid) throws Exception {
    DSElement elem = null;
    Hashtable props = db.getProperties(guid);
    if (props != null) {
      if (db.isTerminal(guid)) {
        elem = new DSTerm();
        elem.setContents(props);
      }
      else if (db.isAssociation(guid)) {
        elem = new DSAsso();
        elem.setContents(props);
```

FROM FIG. 20A

```
    }
    else if (db.isRole(guid)) {
       elem = new DSRole("oooo", "oooo");
       elem.setContents(props);
    }
  }
  return elem;
}

/**
Creates an instance of a DSTerm object and populates it with the
properties found in the data store with the specified GUID.
*/
public static DSTerm construcTerm(DB db, String guid) throws Exception {
  DSTerm term = null;
  if (db.isTerminal(guid)) {
    term = new DSTerm();
    term.setContents(db.getProperties(guid));
  }
  return term;
}
/**
Creates an instance of a DSAsso object and populates it with the
properties found in the data store with the specified GUID.
*/
public static DSAsso constructAsso(DB db, String guid) throws Exception {
  DSAsso osso = null;
  if (db.isAssociation(guid)) {
    osso = new DSAsso();
    osso.setContents(db.getProperties(guid));
  }
  return osso;
}
```

*FIG. 20B*

EXAMPLE OF JAVA FILES FOR AN ASSOCIATIVE DATASTORE

```java
/**
Creates an instance of a DSRole object and populates it with the
properties found in the data store with the specified GUID.
*/
public static DSRole constructRole(DB db, String guid) throws Exception {
  DSRole role = null;
  if (db.isRole(guid)) {
      role = new DSRole("aaaa", "aaaa");
      role.setContents(db.getProperties(guid));
  }
  return role;
}
//-------------------------------------------------------
//Private Instance Variables
//-------------------------------------------------------
private static boolean Debug = true;

//-------------------------------------------------------
//Private Static Methods
//-------------------------------------------------------
private static void walkAssociations(DSTerm term, DSRole inRole, int level, DB db,
DSCommand dsc,
  Hashtable termCache, Hashtable assoCache, Hashtable roleCache, Vector badElems)
  throws Exception {
  Vector roles = db.getRolesOfTerm(term.getGUID();
  //System.out.println("Get role/asso pairs for " + term.getGUID() + " [");
  if (badElems != null && roles.size() < 1) {
     badElems.addElement(term);
  }
  for (Enumeration en = roles.elements(); en.hasMoreElements(); ) {
    String roleGuid = (String)en.nextElement();
    //System.out.println("RoleGUID: " + roleGuid);
    String assoGuid = db.getAsso(roleGuid);
    if (assoGuid !=null) {
```

FROM FIG. 21A

```
    //System.out.println("AssoGUID: " + assoGuid);
    DSAsso asso = (DSAsso)assoCache.get(assoGuid);
    if (asso == null) {
      asso = constructAsso(db, assoGuid);
      dsc.addItem(asso);
      assoCache.put(assoGuid, asso);
    }

DSRole role = (DSRole)roleCache.get(roleGuid);
    if (role == null) {
      role = constructRole(db, roleGuid);
      asso.addItem(role);
      roleCache.put(roleGuid, role);
    }
    else continue;

if (role == inRole) continue;

if (level > 0) {
       walkTerminals(asso, role, level-1, db, dsc,
         termCache, assoCache, roleCache, badElems);
    }
   }
   else {
     if (badElems != null)
        badElems.addElement(constructRole(db, roleGuid));
    }
   }
  //System.out.println("]");
} private static void walkTerminals(DSAsso asso, DSRole inRole, int level, DB db,
DSCommand dsc,
   Hashtable termCache, Hashtable assoCache, Hashtable roleCache, Vector badElems)
   throws Exception {
   Vector roles = db.getRolesOfAsso(asso.getGUID();
   //System.out.println("Get role/term pairs for " + asso.getGUID() + " [");
   if (badElems != null && roles.size() < 2 {
      badElems.addElement(asso);
   }
```

*FIG. 21B*

EXAMPLE OF JAVA FILES FOR AN ASSOCIATIVE DATASTORE

```java
   for (Enumeration en = roles.elements(); en.hasMoreElements(); ) {
      String roleGuid = (String)en.nextElement();
      //System.out.println("RoleGUID: " + roleGuid);
      String termGuid = db.getTerms(asso.getGUID(), roleGuid);
      if (termGuid !=null) {
         //System.out.println("TermGUID: " + termGuid);
         DSTerm term = (DSTerm)termCache.get(termGuid);
         if (term == null) {
            term = constructTerm(db, termGuid);
            dsc.addItem(term);
            termCache.put(termGuid, term);
         }

DSRole role = (DSRole)roleCache.get(roleGuid);
         if (role == null){
            role = constructRole(db, roleGuid);
            asso.addItem(role);
            roleCache.put(roleGuid, role);
         }
         else continue;

if (role == inRole) continue;

if (level > 0){
            walkAssociations(term, role, level-1, db, dsc,
               termCache, assoCache, roleCache, badElems);
         }
      }
      else {
         if (badElems != null)
            badElems.addElement(constructRole(db, roleGuid));
      }
   }
//System.out.println("]");
 }

METHOD AND SYSTEM FOR PROVIDING AN ASSOCIATIVE DATASTORE WITHIN A DATA PROCESSING SYSTEM

BACKGROUND OF THE INVENTION

1. Technical Field

The present invention relates to a method and system for data processing. Specifically, the method and system provide for structuring data within a database.

2. Description of Related Art

Using prior art methods, when two or more problem-domain objects are linked or otherwise refer to each other, programmers must create sophisticated mechanisms to manage the linkages, which may be cumbersome and error-prone. Typically, in the prior art, both of the linked objects contain, within the objects, information about the relation between the objects, and the relations between the problem-domain objects are rather static.

Products using RDBMS or object-oriented database management systems usually require complicated upgrade scenarios precisely because the databases "know too much" about the data contained within the database. One normally defines primary and foreign keys to build linkages between tuples. Keys and tables cannot be easily changed when relationships changed. The storage mechanism, i.e., the database, is constantly an issue. Ensuring backward compatibility and upgrade conversions may be costly and time-consuming.

Other disadvantages of the prior art are that existing storage systems do not clearly express state as a function of association and that object locking cannot easily be based on the cumulative set of associations to which a given object is a member.

SUMMARY OF THE INVENTION

The present invention implements a datastore for a plurality of generic terminal objects. Terminal objects are related to zero or more association objects that represent a relation between terminal objects. Association objects are typed according to the relationship being represented between terminal objects. An association object has a state value corresponding to a state of the relation between terminal objects. An association object also has a role object for each of the terminal objects being related to the association object. A role object represents a relation between the association object and a terminal object. The role object is typed according to the relationship being represented between the associated object and the terminal object, and the role type is unique amongst the role objects within the association object. The datastore may store the association object and the terminal objects in a relational database on a computer-readable medium.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 10–22 are Java source code files that may be used to implement the present invention.

DETAILED DESCRIPTION OF THE PREFERRED EMBODIMENT

Figure 1:
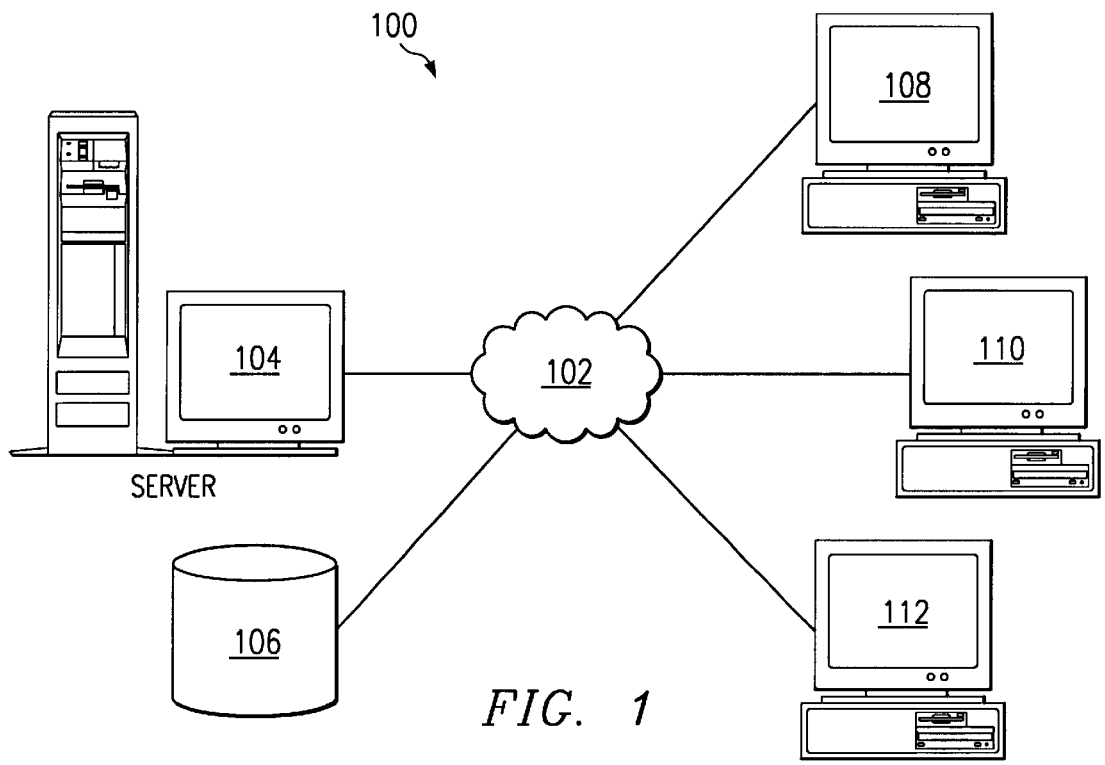
FIG. 1 depicts a pictorial representation of a distributed data processing system in which the present invention may be implemented.

With reference now to the figures, FIG. 1 depicts a pictorial representation of a distributed data processing system in which the present invention may be implemented.

Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational, and other computer systems that route data and messages. Of course, distributed data processing system 100 also may be implemented as a number of different types of networks, such as for example, an intranet, a local area network (LAN), or a wide area network (WAN).

FIG. 1 is intended as an example, and not as an architectural limitation for the processes of the present invention.

Figure 2:
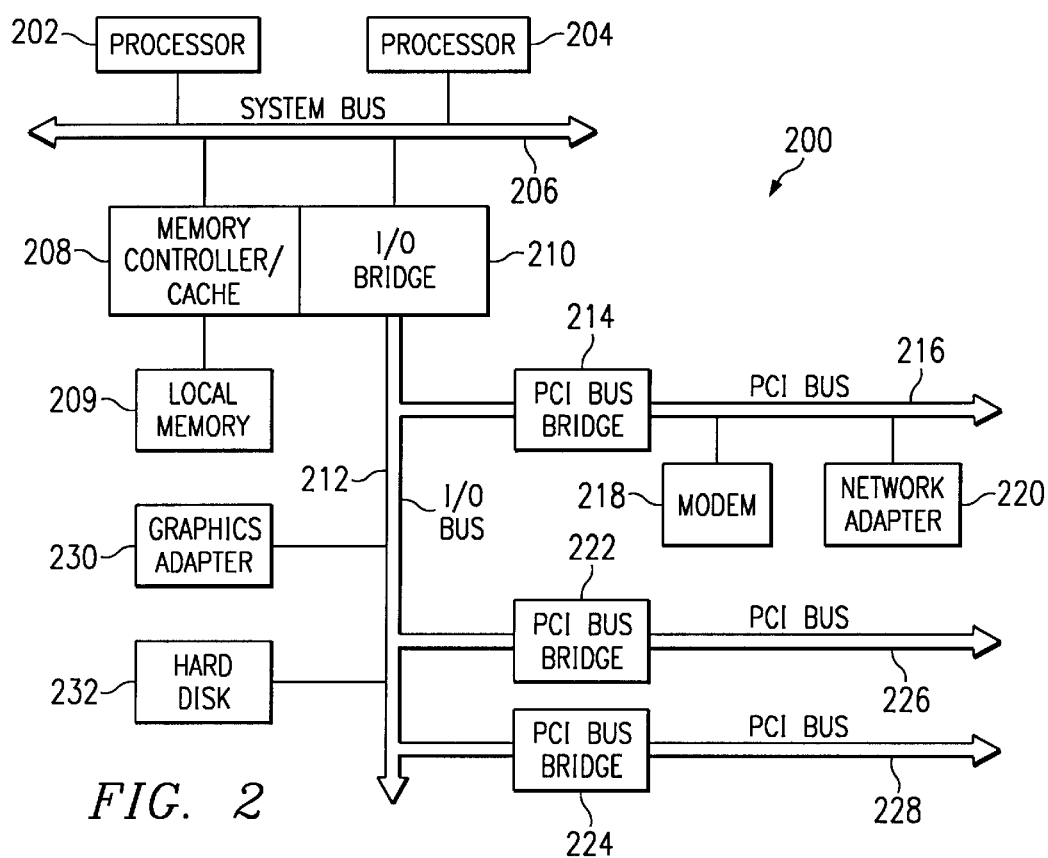
FIG. 2 is a block diagram depicting a data processing system, which may be implemented as a server in a distributed data processing system.

Referring to FIG. 2, a block diagram depicts a data processing system, which may be implemented as a server, such as server 104 in FIG. 1, in accordance to the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218–220 may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drive and the like, also may be used in addition or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
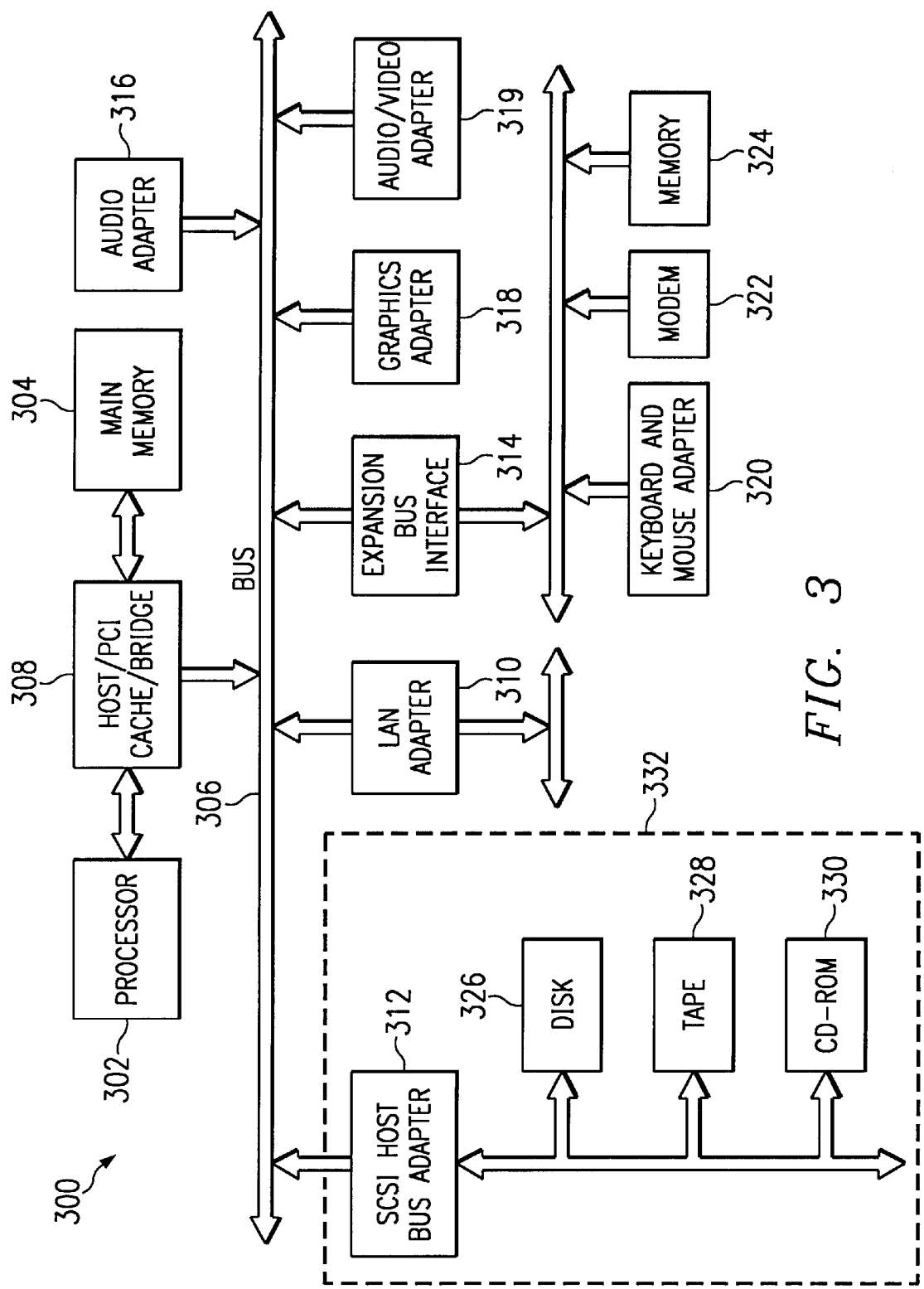
FIG. 3 is a block diagram illustrating a general data processing system in which the present invention may be implemented.

With reference now to FIG. 3, a block diagram illustrates a data processing system in which the present invention may be implemented. Data processing system 300 is an example of a client computer. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video (A/V) adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330 in the depicted example. Typical PCI local bus implementations will support three or four PCI expansion slots or add-in connectors. Data processing system 300 could be connected through graphics adapter 318 to a computer display (not shown).

An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system such as Java™ may run in conjunction with the operating system and provides calls to the operating system from Java™ programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302. Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by the box with the dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide non-volatile memory for storing operating system files and/or user-generated data.

The depicted example in FIG. 3 and above-described examples are not meant to imply architectural limitations with respect to the present invention.

Figure 4:
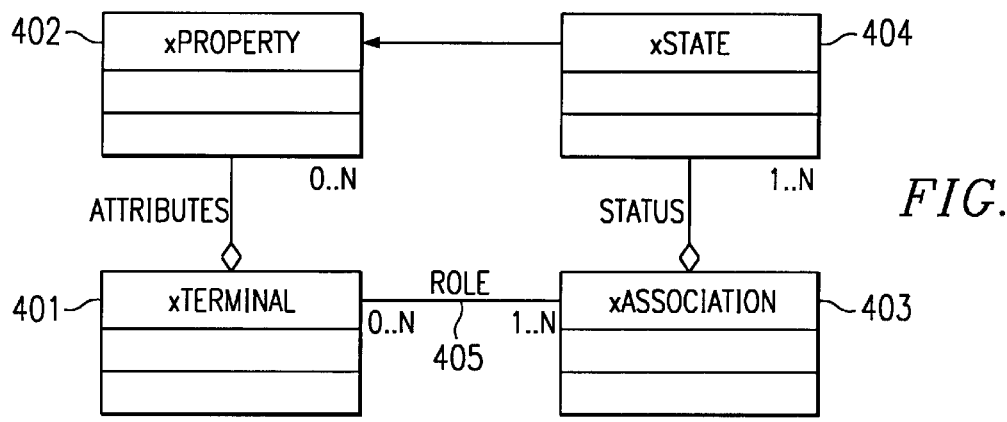
FIG. 4 is a diagram depicting an abstract metamodel that represents the definition of objects and relations for the present invention.

With reference now to FIG. 4, a diagram depicts an abstract metamodel that represents the abstract representation of objects and relations that form the conceptual basis of the present invention. The abstract meta-model may be used to generically represent objects, object classes, object relationships, or other object-oriented entities, etc.

The associations between objects are of special interest. When two or more objects are linked or otherwise refer to each other, programmers using prior art methods must create sophisticated mechanisms to manage the linkages, which may be cumbersome and error-prone. Typically, in the prior art, both of the linked objects contain information about the relation between the objects.

This present invention solves this problem by promoting the object-oriented notion of an association to a first-class object that itself can maintain N-dimensional relationships between itself and other objects. The present invention handles cases where various objects in the system converge or diverge to represent combinatorial states.

As shown in FIG. 4, the objects being associated together are called Terminals, as represented by Terminal 401. Terminals are loosely typed as defined by the problem domain and may be considered generic objects. Terminals are viewed as opaque objects that have some set of arbitrary properties. Terminals are involved in 0 . . . N Associations. A Terminal's presence or absence from certain Associations represents a state of existence. The totality of the states forms the programmatic basis for the manner in which an application views and interprets the overall state problem domain.

The objects that form the relationship hub are called Associations, as represented by Association 403. Associations are loosely typed as defined by the problem domain. Each Association manages 1 . . . N Roles where each Role is related to a Terminal.

An association may manage a single Role. In this case, the Association may merely capture the dynamic State information for a single Terminal.

An Association is associated with a finite set of States. An Association must have only one current State out of the finite set of States, as represented by State 404. States are specialized properties derived from Property 402. Associations comprise aggregations of States. A database designer can model Associations such that each Association class has a finite set of states. States may change under an external influence, such as an external command representing interactions with external participants. As an Association transitions between states, an Association updates the Roles that it is managing, which may require changing the Roles that it is managing. Therefore, each State presumes a given set of Roles must exist.

Each link, reference, relation, or relationship between an Association and a Terminal is completed through a Role, as represented by Role 405. Role's are loosely typed, as defined by the problem domain. An Association may have a set of Roles for each State. Role types may not be unique across States. Since an Association has only one current State at any given time, and since the Role types in use by an Association must be unique within the Association at any given time, Roles types are unique within the set of Roles of each State. Role objects are updated by an Association object as and when required by the Association object. After an Association updates its Roles, the Roles may or may not change-the new Roles may be the same as the previous Roles, whether or not the Association's State was changed during the update. It should be noted that the Roles describe the Terminal in relation to the Association and not vice versa.

Terminals can have an arbitrary set of Properties, as represented by Property 402. Terminals comprise aggregations of Properties. A Property may be a name/value pair. The Associative DataStore makes a simplifying assumption about how data members of objects are represented. It assumes that simple UTF-8 (UCS-TF-8 or Universal Character System Transformation Format for 8-bit characters) values are sufficient to store any value and so provides for Properties to be stored as attribute/value pairs.

Figure 5A:
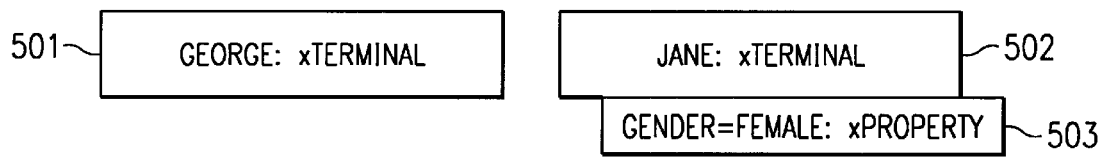
FIG. 5A is a diagram depicting a first example of the metamodel that represents the instantiation of two Terminals with no defined Association.

With reference now to FIG. 5A, a diagram depicts a first example of the metamodel that represents the instantiation of two Terminals with no defined Association. Terminal 501 depicts an object, which in this case is a person named "George", with no defined Properties. Terminals may have Properties but are not required to have Properties. Terminal 502 depicts an object, which in this case is a person named "Jane", with a single defined Property. Property 503 shows that Terminal 502 has a Property named "Gender" with a value equal to "Female". Terminals 501 and 502 exist without an Association defined between the two Terminals.

Figure 5B:
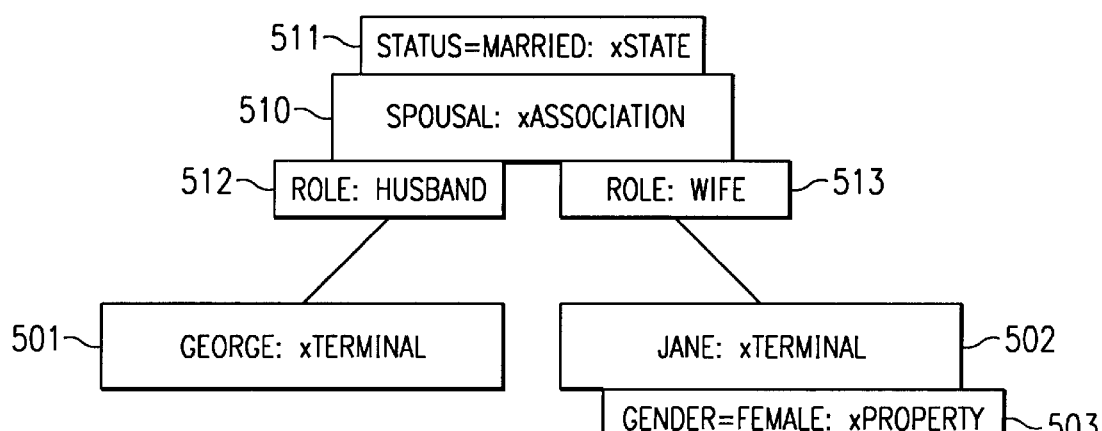
FIG. 5B is a diagram depicting an extension of the first example of the metamodel that represents the instantiation of two Terminals with an Association relating the two Terminals.

With reference now to FIG. 5B, a diagram depicts an extension of the first example of the metamodel that represents the instantiation of two Terminals with an Association relating the two Terminals. Terminals 501 and 502 depict the same objects "George" and "Jane" from FIG. 5A. The example has been extended to define an Association between the two Terminals. Association 510 defines a relationship of type "Spousal" between Terminal 501 and Terminal 502. Association 510 has a State 511 that is defined as "Status" with a value equal to "Married". A link between an Association and a Terminal is called a Role. FIG. 5B shows that Terminal 502 has a Role 513 connecting Terminal 502 with Association 510. Terminal 501 is connected to Association 510 through Role 512. Role 513 has a type "Wife" that relates "Jane" to the Spousal Association. Role 512 has a type "Husband" that relates "George" to the Spousal Association. Overall, FIG. 5B shows that "George" has an Association with "Jane" in which the Association defines a "Married" State, and further in which "George" has a "Husband" Role in this Association and "Jane" has a "Wife" Role in this Association.

Figure 5C:
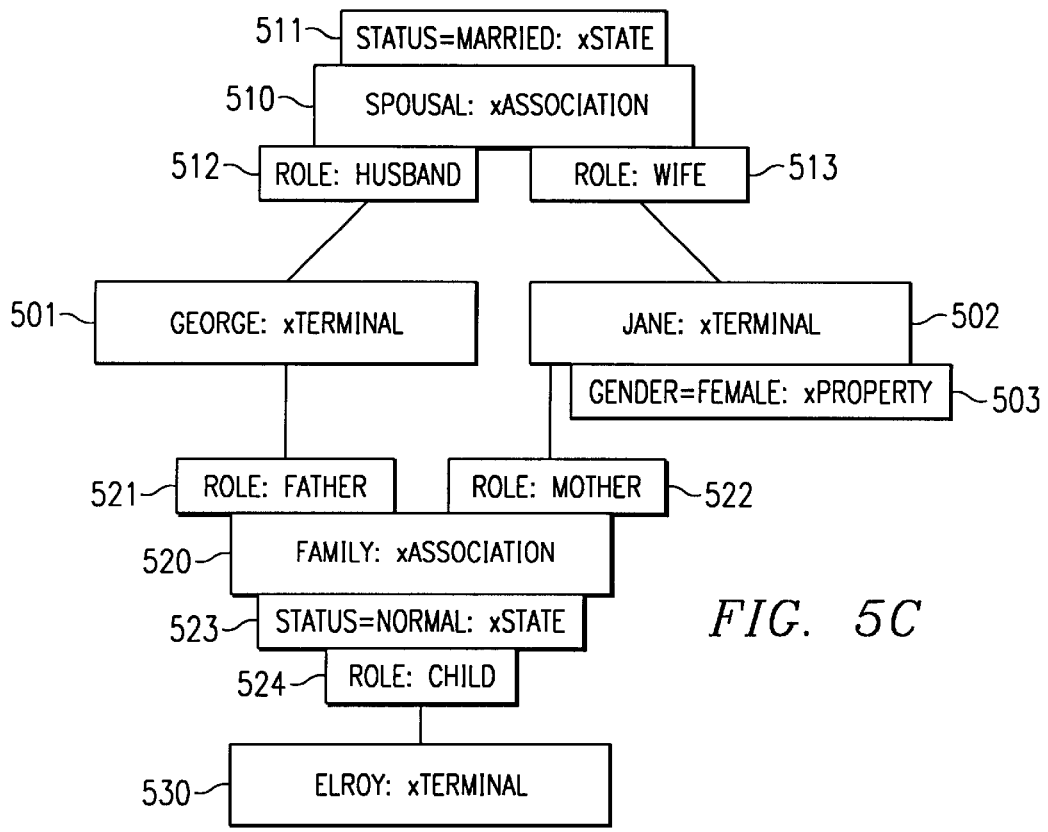
FIG. 5C is a diagram depicting an extension of the first example of the metamodel that represents the instantiation of three Terminals with two Associations relating the three Terminals.

With reference now to FIG. 5C, a diagram depicts an extension of the first example of the metamodel that represents the instantiation of three Terminals with two Associations relating the three Terminals. Similar reference numerals in FIG. 5B and FIG. 5C shows that Terminal 501, Terminal 502, and Association 510 are identical in the two Figures. However, FIG. 5C has extended the example with the addition of another Terminal and another Association. Terminal 530 depicts an object, which in this case is a boy named "Elroy", with no defined Properties. Terminal 530 is linked to Association 520, which is further linked to Terminal 501 and Terminal 502. Association 520 has State 523 named "Status" with a value equal to "Normal". Association 520 has a type equal to "Family". Terminal 530 relates to Association 520 through Role 524. Terminal 501 is linked to Association 520 through Role 521. Terminal 502 is linked to Association 520 through Role 522. Role 524 has type equal to "Child". Role 522 has a type equal to "Mother", and Role 521 has a type equal to "Father". Overall, FIG. 5C extends the example in FIG. 5B with the addition of another object and the addition of another Association linking the new object with the previous objects. "Elroy" has the Role of "Child" in a "Family" Association. "George" and "Jane" have the Roles of "Father" and "Mother" in the same "Family" Association.

Figure 5D:
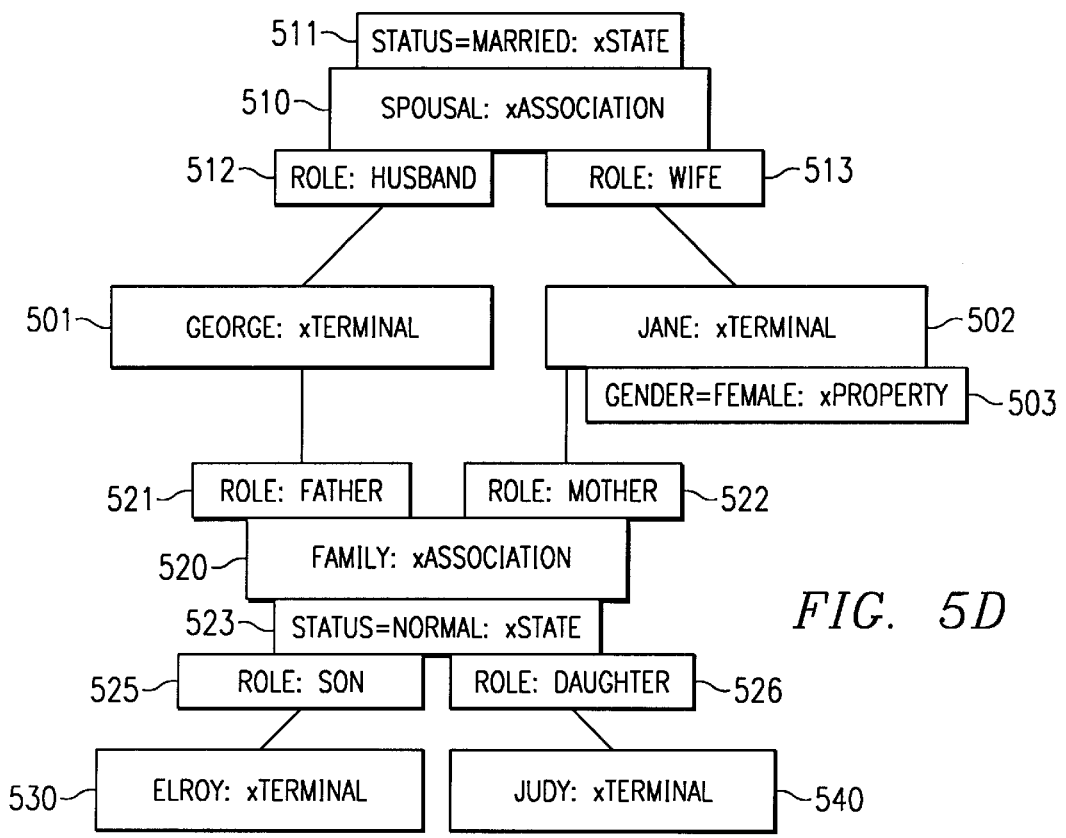
FIG. 5D is a diagram depicting an extension of the first example of the metamodel that represents the instantiation of four Terminals with two Associations relating the four Terminals.

With reference now to FIG. 5D, a diagram depicts an extension of the first example of the metamodel that represents the instantiation of four Terminals with two Associations relating the four Terminals. Similar reference numerals in FIGS. 5D and 5C identify identical elements. In FIG. 5D, Terminal 540 has been added which is related through new Role 526 to previous Association 520. Terminal 540 depicts an object, which in this case is an object named "Judy", with no defined Properties, and new Role 526 has a type equal to "Daughter". Overall, FIG. 5D depicts an example in which "Judy" has the Role of "Daughter" in the previously existing "Family" Association, which also relates objects "George", "Jane", and "Elroy".

Figure 5E:
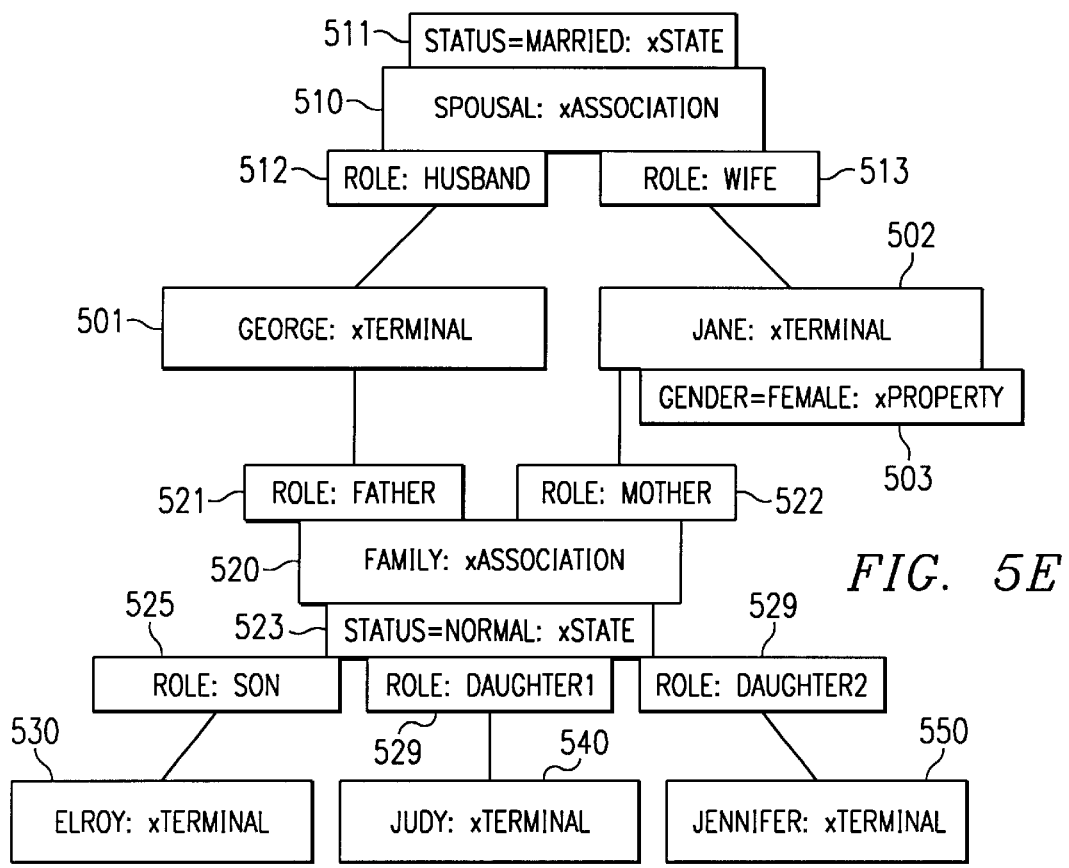
FIG. 5E is a diagram depicting an extension of the first example of the metamodel that represents the instantiation of five Terminals with two Associations relating the five Terminals.

With reference now to FIG. 5E, a diagram depicts an extension of the first example of the metamodel that represents the instantiation of five Terminals with two Associations relating the five Terminals. Similar reference numerals in FIGS. 5E and 5D identify identical elements. In FIG. 5E, a new object has been added and related to the previously existing objects. Terminal 550 is linked to Association 520 through Role 529. Terminal 550 depicts an object named "Jennifer", with no defined Properties, and Role 529 has a type equal to "Daughter2". In other words, an object named "Jennifer" with a Role of "Daughter2" has been added to a "Family" Association. However, an object "Judy" with a Role of "Daughter" was previously included in the same "Family" Association. Roles must be unique within an Association. Therefore, the addition of a new object linked to the same "Family" Association with a value for a Role type equal to a previously existing Role type value will cause the previously existing Role to change. As there may not be two Terminals with identical Roles in a single Association, the link between Terminal 540 and Association 520 has been changed so that Terminal 540 is now linked to Association 520 through Role 529. Role 529 has a type equal to "Daughter1". In this manner, Terminal 540 and Terminal 550 may have unique but similar Roles in Association 520. Association 520 is responsible for updating the Roles within its Association.

Figure 6A:
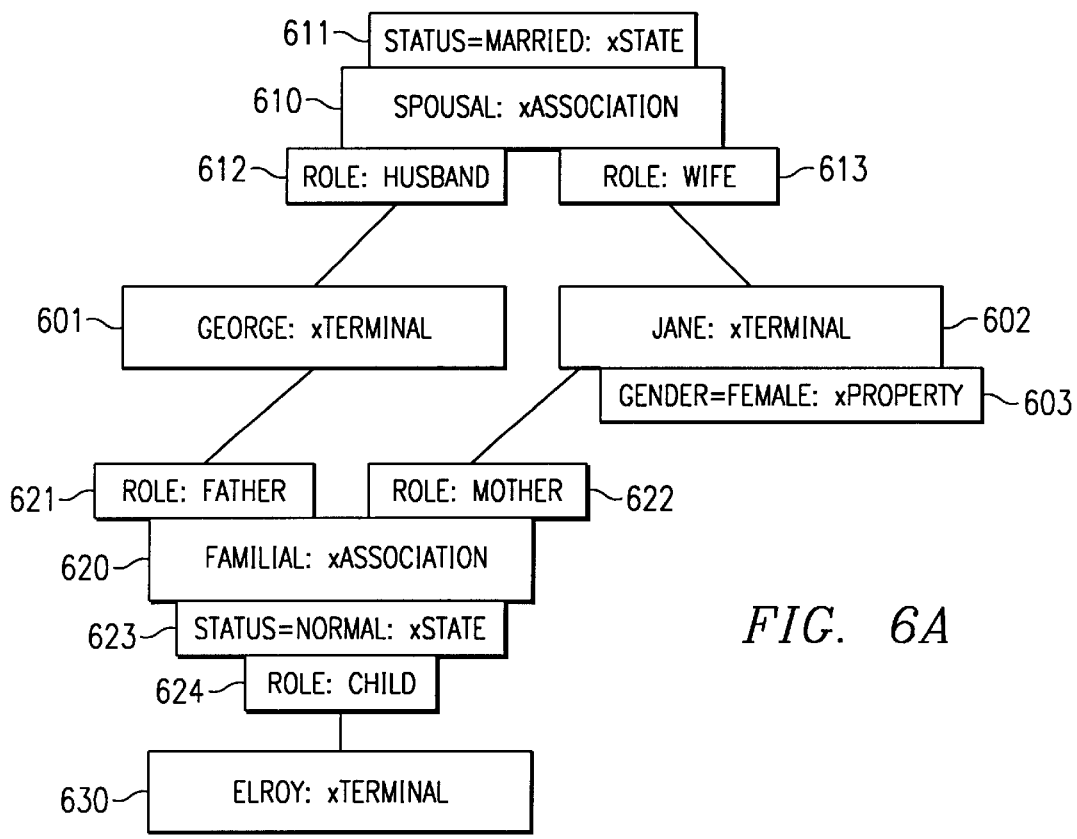
FIG. 6A is a diagram depicting a second example of the metamodel that represents Terminals and Associations similar to those of FIG. 5C but in which two Associations relate the three Terminals in a slightly different manner.

With reference now to FIG. 6A, a diagram depicts a second example of the metamodel that represents Terminals and Association similar to those of FIG. 5C but in which two Associations relate the three Terminals in a slightly different manner. Similar to the previous example, Terminal 601 is related to Association 610 through Role 612. Terminal 602 is related to Association 610 through Role 613. Association 610 has State 611 with a type equal to "Status" with a value equal to "Married". Association 610 is a "Spousal" Association relating objects "George" and "Jane" through Roles "Husband" and "Wife". Terminal 602 has Property 603 defining a Property named "Gender" with a value equal to "Female". Terminal 630 is related to Association 620 through Role 624. Terminal 601 is related to Association 620 through Role 621, and Terminal 602 is related to Association 620 through Role 622. Association 620 has State 623 with a type "Status" with a value equal to "Normal". Similar to the example in FIGS. 5A–5E, an object named "Elroy" is related to objects "George" and "Jane" in a "Family" Association. However, the example in FIG. 6A has two significant differences. Terminal 630 is related to the other Terminals in the example by Role 624 with a type equal to "Child" rather than a type equal to "Son". Also, Association 620 defines an Association with a type equal to "Familial" rather than a type equal to "Family".

Figure 6B:
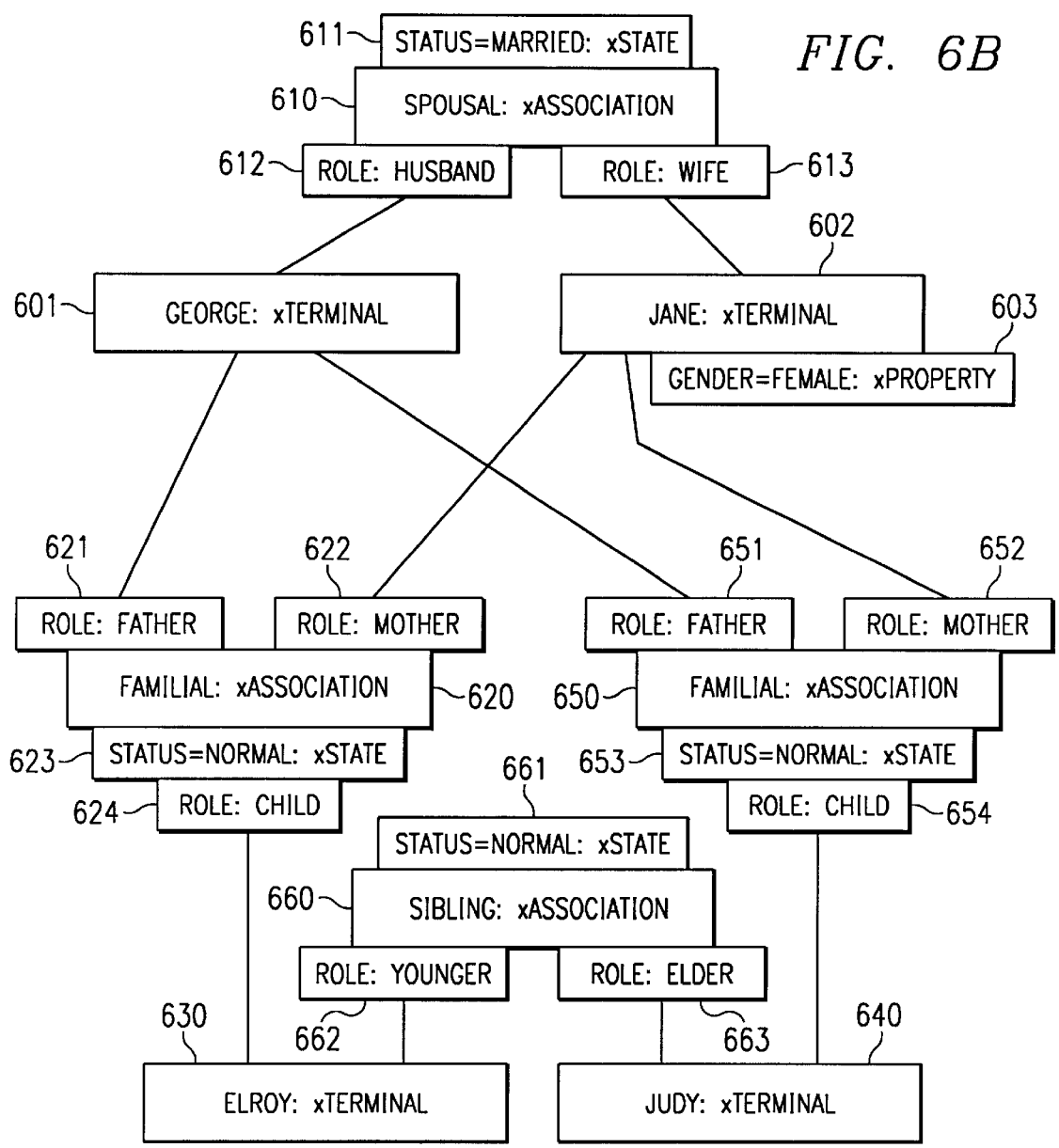
FIG. 6B is a diagram depicting an extension of the second example of the metamodel that represents Terminals and Associations similar to those of FIG. 5D but in which four Associations relate the three Terminals in different manner.

With reference now to FIG. 6B, a diagram depicts an extension of the second example of the metamodel that represents Terminals and Associations similar to those of FIG. 5D but in which four Associations relate the three Terminals in a different manner. Similar reference numbers in FIGS. 6A and 6B identify similar elements. In FIG. 6B, Terminal 640 has been added and is linked to Association 650 through Role 654. Association 650 has been added and defines a Familial Association among Terminals 602, 640, and 601. Association 650 has State 653, with a type equal to "Status" and a value equal to "Normal". Terminal 602 relates to Association 650 through Role 652, and Terminal 601 relates to Association 650 through Role 651. Role 654 has a type equal to "Child", Role 651 has a type equal to "Father", and Role 652 has a type equal to "Mother". Terminal 640 defines an object "Judy" that is then related through a "Child" Role to a "Familial" Association defined by Association 650. In other words, the object "Judy" is shown as a "Child" object of object "George" with Role "Father" and object "Jane" with Role "Mother".

Newly added Terminal 640 is then related to previously existing Terminal 630 through newly added Association 660. Association 660 defines a sibling association between Terminal 640 and Terminal 630. Terminal 640 is linked to Association 660 through Role 663, and Terminal 630 is related to Association 660 through Role 662. Association 660 has State 661 with a type equal to "Status" and a value equal to "Normal". Role 663 has a type equal to "Older", and Role 662 has a type equal to "Younger". In other words, a Terminal "Judy" is related to a Terminal "Elroy" through a "Sibling" Association in which each object has a unique Role of either "Older" or "Younger" "Sibling". Overall, FIG. 6B depicts a family with two Terminals having "Child" Roles yet related to other Terminals through two "Familial" Associations.

The difference between FIG. 6B and FIG. 5D can be seen in that FIG. 6B defines a "Familial" Association as represented by Association 620 and Association 650. FIG. 6B represents an organization in which each Terminal is linked to the other Terminal through an appropriate family-type Association. Object "Elroy" is related to object "Judy" through object "Sibling", and object "George" is related to object "Jane" as through object "Spousal". Object "Elroy" and object "Judy" are then related by Roles "Father" and "Mother" by separate "Familial" Associations. In contrast, FIG. 5D shows that Association 520 represents a "Family" Association, which acts as a centrally organizing Association.

FIG. 5D and FIG. 6B each represent a valid organization of family information using the Associative DataStore metamodel of the present invention. Each use of the metamodel may have its own advantages and disadvantages. However, the advantages provided by an Association object representing a relation between the Terminals is present in each example of the metamodel.

Figure 7:
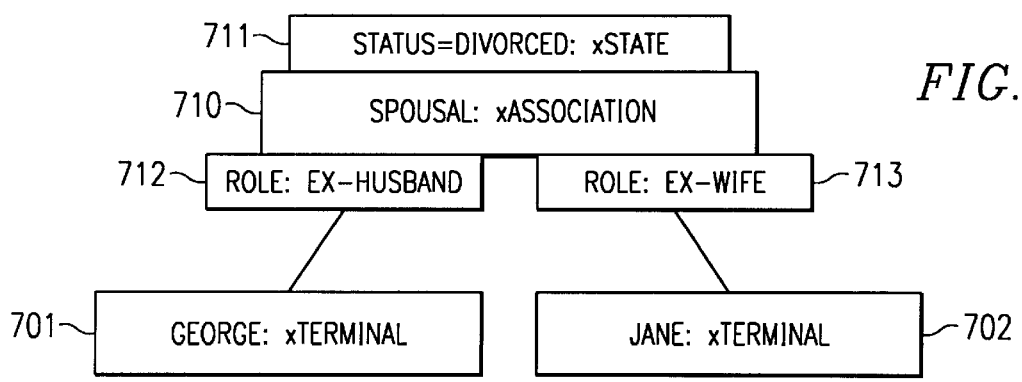
FIG. 7 is a diagram depicting a third example of the metamodel that represents the instantiation of two Terminals with an Association relating the two Terminals.

With reference now to FIG. 7, a diagram depicts a third example of the metamodel that represents the instantiation of two Terminals with an Association relating the two Terminals. Terminals 701 and 702 depict the same objects "George" and "Jane" from the example in FIG. 5B, which has been extended to show the result of a state transition of an Association between the two Terminals.

Association 710 defines a relationship of type "Spousal" between Terminal 701 and Terminal 702. Association 710 has a State 711 that is defined as "Status" with a value equal to "Divorced". Terminal 702 has a Role 713 connecting Terminal 702 with Association 710. Terminal 701 is connected to Association 710 through Role 712. Role 713 has a type "Ex-wife" that relates "Jane" to the Spousal Association. Role 712 has a type "Ex-husband" that relates "George" to the Spousal Association.

Overall, FIG. 7 shows that object "George" relates to object "Jane" in a "Spousal" Association with a "Divorced" State, and further in which object "George" has an "Ex-husband" Role in this Association and object "Jane" has a "Ex-wife" Role in this Association. As shown by a comparison of FIG. 7 and FIG. 5B, an external influence has caused a transition of states. In order to transition from "Married" to "Divorced", Association 710 has updated the Roles that it manages to Roles which are appropriate for the new state.

Figure 8A:
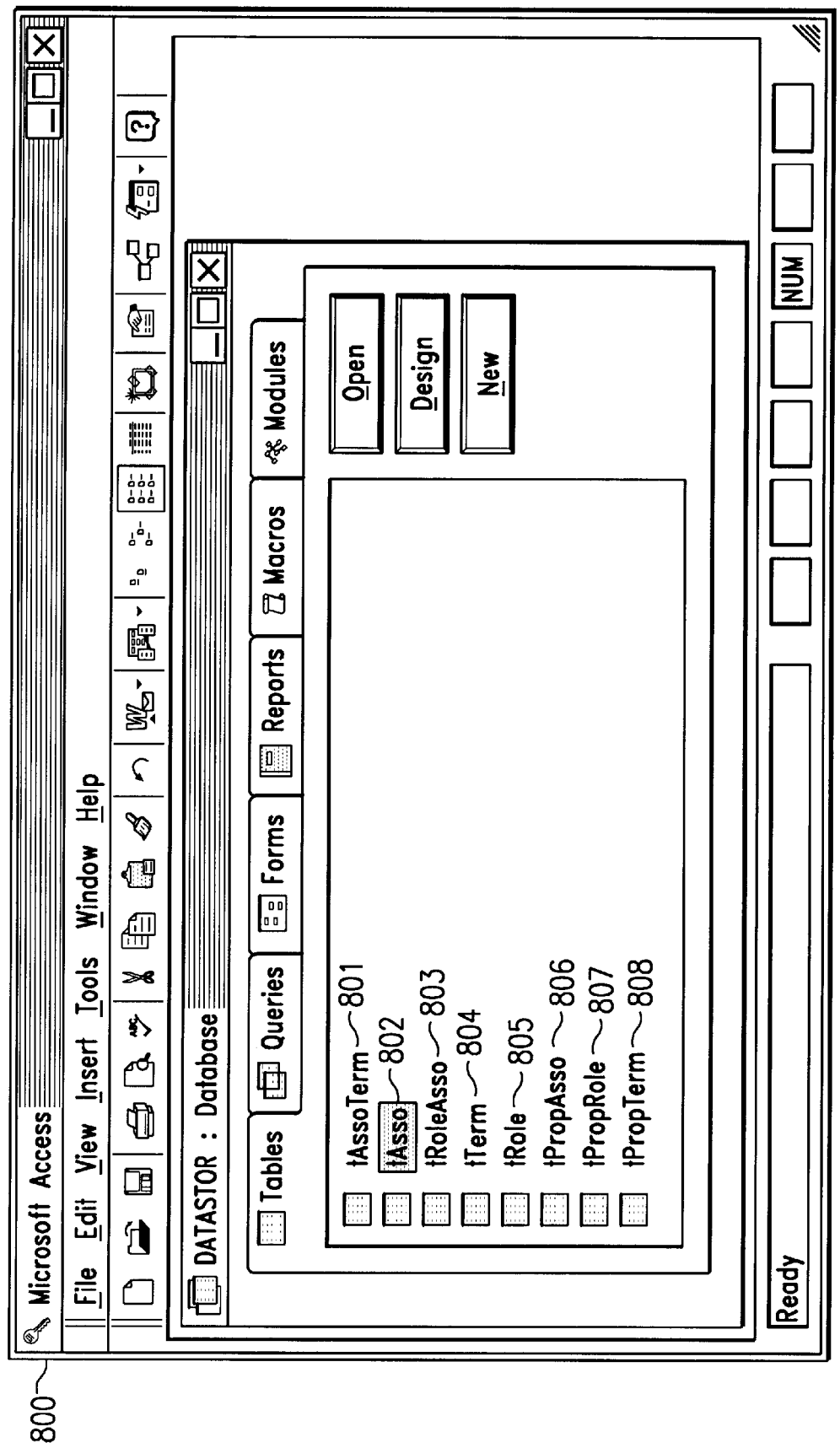
FIG. 8A is an example of a definition of a set of database tables that may be used to implement the Associative DataStore of the present invention within the Microsoft Access database application.
Figure 8B:
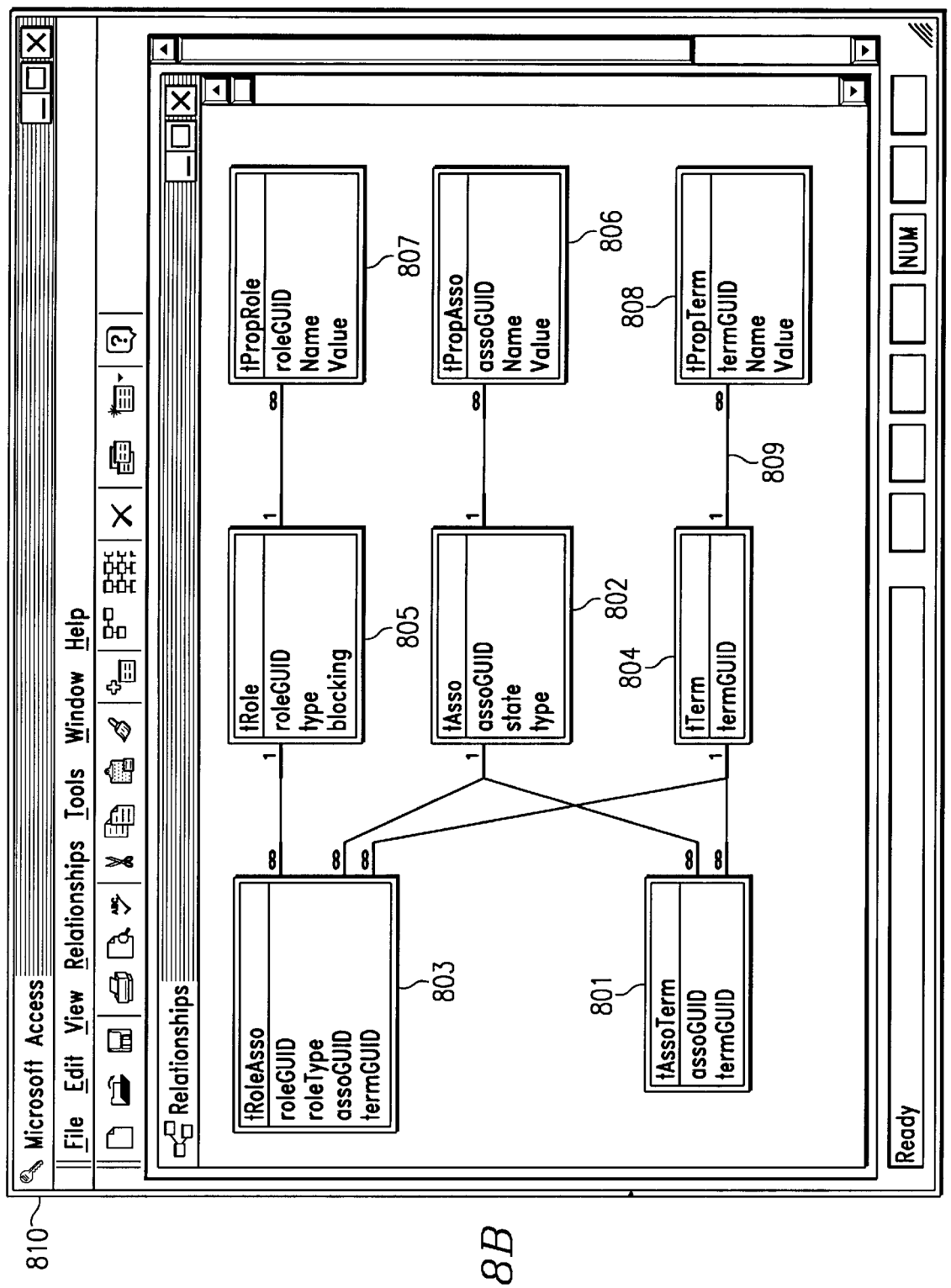
FIG. 8B is an example of a definition of a relational schema using the tables shown in FIG. 8A that may be used to implement the Associative DataStore of the present invention within the Microsoft Access database application.

With reference now to FIG. 8A, a window snapshot shows an example of a definition of a set of database tables that may be used to implement the present invention within the Microsoft Access application, available from Microsoft Corporation. A variety of relational database management systems could have been used to implement the present invention. FIGS. 8A and 8B merely provide an example of a commercially and widely available database application that may be used as an underlying database for implementing the Associative DataStore of the present invention.

Graphical user interface window 800 shows that Microsoft Access has opened the DATASTOR database in a child window. The DATASTOR database contains the set of tables and relationships for data structures for computer-usable media that, when combined together with computer hardware, as described above with respect to FIGS. 1-3, and computer software, as described below with respect to FIGS. 9-21, provide concrete, non-abstract, practical, computer-related subject matter for the implementation details of the abstract metamodel of an Associative DataStore, as described above with respect to FIGS. 4-7.

In manners that are well-known in the computing arts, tables are fundamental structures in relational database management systems. Tables are collections of data about specific topics. Separate tables are used for each topic or subject so that the data is stored only once with each table organized into fields and records along the table columns and table rows.

In the set of tables in FIG. 5A, table tAssoTerm 801 is a table for relating an Association with a Terminal. Table tAsso 802 is a table for storing instances of Associations. Table tRoleAsso 803 is a table for relating a Role with an Association and a Terminal. Table tTerm 804 is a table for storing instances of Terminals. Table tRole 805 is a table for instances of Roles. Table tPropTerm 808 is a table for storing Properties of Terminals. Table tPropAsso 806 is a table for storing Properties of Associations. Table tPropRole 807 is a table for storing Properties of Roles. Properties may be stored with Associations or Roles as a programming convenience for an application using or implementing the relational database.

As can be seen, the tables of FIG. 8A have practical purposes supporting the abstract metamodel of FIG. 4. Each instance of xTerminal 401 would have an entry in table tTerm 804. Optional instances of xProperty 402 of xTerminal 401 would be stored in table tPropTerm 808. Each instance of Role 405 would be stored in table tRole 805. Each instance of xAssociation 403 and its xState 404 would be stored in table tAsso 802. Each instance of xAssociation 403 has a state that is stored within table tAsso 801.

With reference now to FIG. 8B, a window snapshot shows an example of a definition of a relational schema with the tables shown in FIG. 8A that may be used to implement the present invention within the Microsoft Access application.

Graphical user interface window 810 shows that Microsoft Access has opened the Relationships tools for the DATASTOR database in a child window. In manners that are well-known in the computing arts, relationships are associations between common fields in different tables. A relationship works by matching data in key fields-usually a field with the same name in both tables.

In most cases, these matching fields are the primary key from one table, which provides a unique identifier for each record, and a foreign key in the other table. A primary key is one or more fields whose value or values uniquely identify each record in a table. In a relationship, a primary key is used to refer to specific records in one table from another table. A primary key is called a foreign key when it is referred to from another table. A foreign key is one or more table fields that refer to the primary key field or fields in another table. A foreign key indicates how the tables are related-the data in the foreign key and primary key fields must match.

Relationships may be one-to-one, one-to-many, or many-to-many. In a one-to-one relationship, each record in a first table can have only one matching record in a second table, and each record in the second table may have only one matching record in the first table. In a one-to-many relationship, a record in a first table may have many matching records in a second table, but a record in the second table has only one matching record in the first table. In a many-to-many relationship, a record in a first table can have many matching records in a second table, and a record in the second table may have many matching records in the first table.

In the relational schema shown in FIG. 8B, each table has a one-to-many relationship with its related table or related tables. For example, table tTerm 804 has a one-to-many relationship with table tPropTerm 808, depicted by graphical link 809 showing a "one" on the first end of the link and an infinity symbol "∞" on the other end of the link. It should be noted that these numerical relationships should not be interpreted as the same as those shown in FIG. 4. The one-to-many relationship merely allows more than one of the relationships to exist but does not require that at least one of the relationships must exist. For example, table tTerm 804 has a one-to-many relationship with table tPropTerm 808 because even though a Terminal is not required to have any Properties, it may have many Properties, and the Properties belong to a single Terminal.

Figure 9:
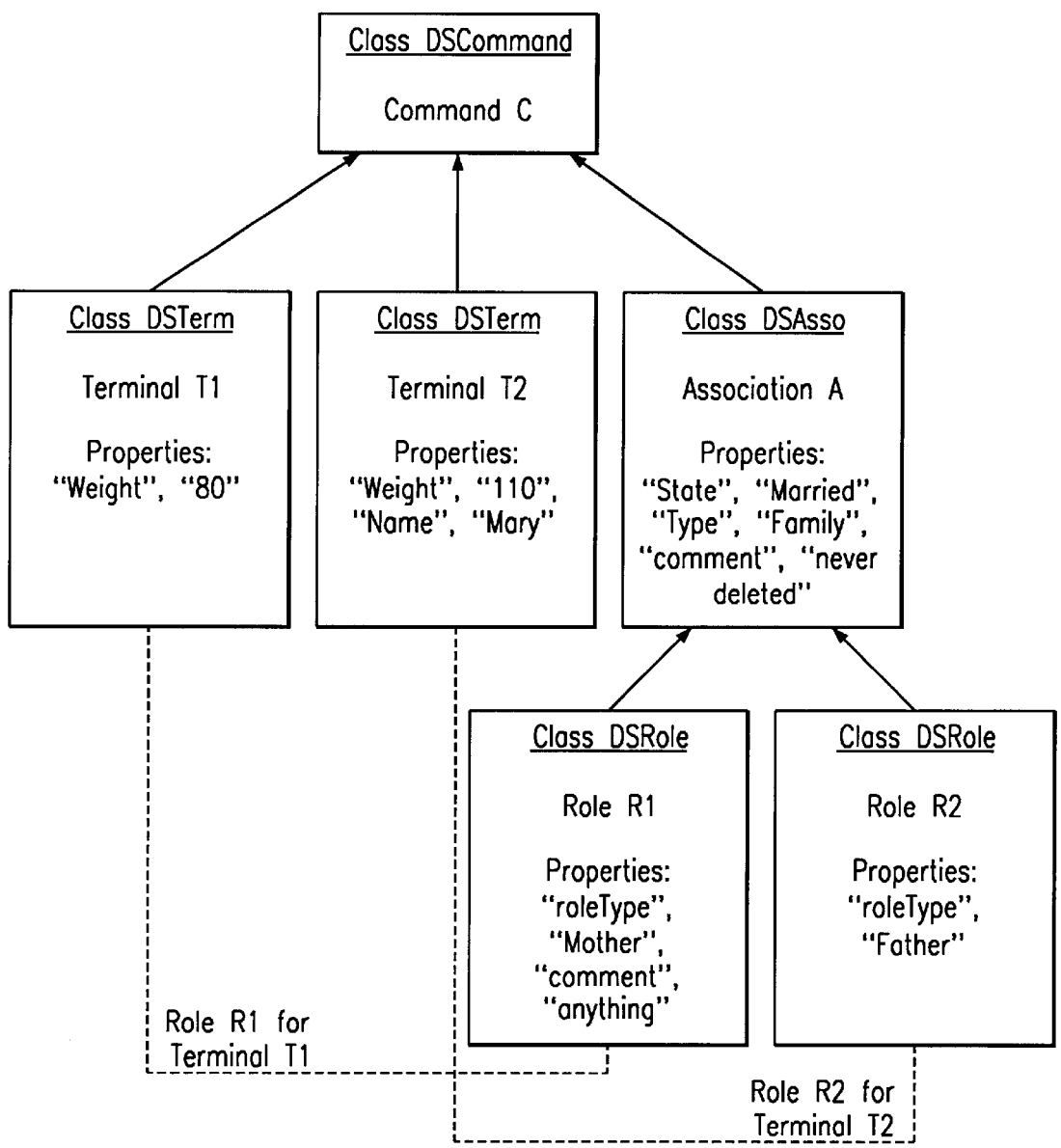
FIG. 9 is a block diagram depicting the relationship between the Java classes disclosed in FIGS. 10–22.

The following tables explain how the eight tables shown in FIGS. 8A and 8B could be used to capture the data in FIG. 9 into a relational database according to the Associative DataStore model. All tables are bound together with the schema given in FIG. 8B.

In that schema, bolded fields within the tables represent primary keys of the table. The GUID (Global Unique ID) of each Terminal is stored in a separate table, such as tTerm, with the termGUID as a primary key of the table so that two Terminals could not have the same GUID.

|             | termGUID |
|-------------|----------|
| Table tTerm | T1       |
|             | T2       |

The Properties of a Terminal are stored in the tPropTerm table. In this example, "termGUID" and the name of the property, "Name", together form a unique key of the table. As shown in the table below, any Terminal can have an arbitrary number of Properties provided the name of the Property is unique for a given Terminal. termGUID Name Value

|  | termGUID | Name | Value |
|---|---|---|---|
| Table tPropTerm | T1 | Weight | 80 |
|  | T2 | Weight | 110 |
|  | T2 | Name | Mary |

Similarly, the GUID of an Association is stored in the tAsso table along with its important Property "state".

|  | assoGUID | state | type |
|---|---|---|---|
| Table tAsso | A | Married | Family |

The Association Properties are saved in tPropAsso table exactly the same way as Terminal Properties in the tPropTerm table:

|  | assoGUID | Name | Value |
|---|---|---|---|
| Table tPropAsso | A | comment | "never deleted" |

The table below shows how the Roles are saved in the tRole table. In this example, the "blocking" field is implementation-specific and may not exist in other implementations of the Associative DataStore. In this case, the "blocking" field provides a semaphore-type flag for uninterrupted updating of the database.

|  | roleGUID | type | blocking |
|---|---|---|---|
| Table tRole | R1 | Mother | no |
|  | R2 | Father | yes |

The Role Properties are saved in tPropRole table exactly the same way as Terminal properties in the tPropTerm table:

|  | roleGUID | Name | Value |
|---|---|---|---|
| Table tpropRole | R1 | comment | "any thing" |

In order to make sure that, within a specific Association, only a single Terminal can play a Role of specific type, the tRoleAsso table is populated with the "roleType" and "assoGUID" together forming the unique key.

|  | roleGUID | roleType | assoGUID | termGUID |
|---|---|---|---|---|
| Table tRoleAsso | R1 | Mother | A | T1 |
|  | R2 | Father | A | T2 |

Also, Terminals are unique within an Association. Therefore, table tAssoTerm is populated with "assoGUID" and "termGUID" together as primary key of the table.

|  | assoGUID | termGUID |
|---|---|---|
| Table tAssoTerm | A | T1 |
|  | A | T2 |

With reference now to FIG. 9, a block diagram depicts the relationship between the Java classes disclosed in FIGS. 10–22. In this example, an Association "A" is created (class DSAsso) between the two terminals "T1" and "T2", (class DSTerm) and in this Association, "T1" and "T2" perform the Roles "R1" and "R2" (class DSRole). The methods to create these elements are described in their respective Java files; for example, DSAsso.jav file relates to the DSAsso table. The Java classes would be found in the com.tivoli.ds package after compiling of the code in FIGS. 10–22. Class DSCommand is used to glue various portions of Java code for the purpose of sending it to the database. The elements are stored in the tables of a relational database by using an apply( ) of the appropriate database package on the JVM.

With reference now to FIGS. 10–22, the figures provide Java source code that may be used to implement the present invention. The Java source code defines classes within a Java package that may be used by a software developer to employ a Associative DataStore that follows the relational schema given in FIG. 8B. The classes are designed such that they present an Associative-DataStore-layer application programming interface (API) between a Java application and an underlying database. Given these classes, the software developer need not be concerned with the details of using a particular database nor the manner in which the database is maintained. In the example in FIGS. 8A, 8B, and 10–22, the underlying database is Microsoft Access, and a Java application using the Associative-DataStore API would not be aware that the Associative DataStore is maintained in a Microsoft Access database.

The Associative DataStore of the present invention specifies a means of representing and persisting arbitrary objects, properties and associations in a flexible and extensible manner. The present invention specifically supports data storage situations in which the object types and relationships are not known at design time or are guaranteed to change during the lifetime of an information product.

An advantage of the Associative DataStore is that it utilizes the performance and power of relational database management systems (RDBMS) without incurring the overhead and inflexibility of having to explicitly map domain classes of the derived application into relational tables. The subsystem specifies an interface or Associative-DataStore API to RDBMS storage products, such as Microsoft Access, that map the abstract metamodel described in FIG. 4 into the relational tables described in FIGS. 8A and 8B. Because the relational schema required to hold the metamodel is straightforward and static in nature, it should rarely need to be modified.

Another advantage of the present invention is that it simplifies upgrade paths as well. In the prior art, products using RDBMS or object-oriented database management systems require complicated upgrade scenarios precisely because the databases "know too much" about the data contained within the database. The present invention puts the responsibility for controlling data organization, content, and meaning in the hands of software developers in a way that eliminates the storage mechanism, i.e., the database, as an issue. The advantage is that software can more readily account for changes between product versions, thus simplifying backward compatibility and upgrade conversions.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for implementing a datastore for a plurality of terminal objects in a data processing system, a terminal object being a generic object to be stored in the datastore, the method comprising the computer-implemented steps of:
   determining a relation for a plurality of terminal objects;
   generating an association object to represent the relation for the plurality of terminal objects, the association object comprising:
      a data value for an association type corresponding to a type of the relation to be represented for the plurality of terminal objects;
      a data value for an association state corresponding to a state of the relation to be represented for the plurality of terminal objects; and
      a role object, for each terminal object being related by the association object, that represents a relation between the association object and a terminal object, the role object comprising a data value of a role type corresponding to a type of the relation to be represented between the associated object and the terminal object, wherein the data value of the role type is unique amongst each role object within the association object; and
   storing the association object and the plurality of terminal objects on a computer-readable medium.

2. The method according to claim 1 further comprising, in response to a determination that the association object is transitioning from a first state value to a second state value, updating each role object of the association object.

3. The method according to claim 2 wherein the updating of each role object comprises changing a data value of the role type in each role object in the association object.

4. The method according to claim 1 wherein the association object, each role object, and each terminal object comprise zero or more property data values.

5. The method according to claim 1 wherein a relation comprises a link, a reference, or a relationship between objects.

6. The method according to claim 1 further comprising retrieving a terminal object in accordance with a query on the datastore.

7. The method according to claim 1 wherein the terminal object is related to zero or more association objects.

8. A method for implementing a datastore for a plurality of terminal objects in a data processing system, a terminal object being a generic object to be stored in the datastore, the method comprising the computer-implemented steps of:
   determining a relation for a plurality of terminal objects;
   generating an association object to represent the relation for the plurality of terminal objects, the association object comprising:
      a data value for an association type corresponding to a type of the relation to be represented for the plurality of terminal objects;
      a data value for an association state corresponding to a state of the relation to be represented for the plurality of terminal objects; and
      a role object, for each terminal object being related by the association object, that represents a relation between the association object and a terminal object, the role object comprising a data value of a role type corresponding to a type of the relation to be represented between the associated object and the terminal object, wherein the data value of the role type is unique amongst each role object within the association object; and
   storing the association object and the plurality of terminal objects on a computer-readable medium;
   wherein the association object and the plurality of terminal objects are stored in a relational database management system.

9. A method for implementing a datastore in a data processing system, the method comprising the computer-implemented steps of. determining an association for a plurality of generic objects;
   generating an association object, the association object comprising an association type and an association state;
   storing the association object and the plurality of generic objects on a computer-readable medium;
   specifying a data value for the association type corresponding to a type of the relation to be represented for the plurality of terminal objects;
   specifying a data value for the association state corresponding to a state of the relation to be represented for the plurality of terminal objects; and
   specifying a role object, for each terminal object being related by the association object, that represents a relation between the association object and a terminal object, the role object comprising a data value of a role type corresponding to a type of the relation to be represented between the associated object and the terminal object, wherein the data value of the role type is unique amongst each role object within the association object.

10. A data processing system for implementing a datastore for a plurality of terminal objects, a terminal object being a generic object to be stored in the datastore, the data processing system comprising:
   determination means for determining a relation for a plurality of terminal objects;
   generation means for generating an association object to represent the relation for the plurality of terminal objects, the association object comprising:
      a data value for an association type corresponding to a type of the relation to be represented for the plurality of terminal objects;
      a data value for an association state corresponding to a state of the relation to be represented for the plurality of terminal objects; and a role object, for each terminal object being related by the association object, that represents a relation between the association object and a terminal object, the role object comprising a data value of a role type corresponding to a type of the relation to be represented between the associated object and the terminal object, wherein the data value of the role type is unique amongst each role object within the association object; and storage is for storing the association object and the plurality of terminal objects on a computer-readable medium.

11. The data processing system according to claim 10 further comprising, in response to a determination that the association object is transitioning from a first state value to a second state value, updating means for updating each role object of the association object.

12. The data processing system according to claim 11 wherein the updating means for updating each role object comprises changing means for changing a data value of the role type in each role object in the association object.

13. The data processing system according to claim 10 wherein the association object, each role object, and each terminal object comprise zero or more property data values.

14. The data processing system according to claim 10 wherein a relation comprises a link, a reference, or a relationship between objects.

15. The data processing system according to claim 10 further comprising retrieval means for retrieving a terminal object in accordance with a query on the datastore.

16. The data processing system according to claim 10 wherein the association object and the plurality of terminal objects are stored in a relational database management system.

17. The data processing system according to claim 11 wherein the terminal object is related to zero or more association objects.

18. A data processing system for implementing a datastore, the data processing system comprising:

determination means for determining an association for a plurality of generic objects;

generation means for generating an association object, the association object comprising an association type and an association state; and storage means for storing the association object and the plurality of generic objects on a computer-readable medium;

a data value for the association type corresponding to a type of the relation to be represented for the plurality of terminal objects;

a data value for the association state corresponding to a state of the relation to be represented for the plurality of terminal objects; and a role object, for each terminal object being related by the association object, that represents a relation between the association object and a terminal object, the role object comprising a data value of a role type corresponding to a type of the relation to be represented between the associated object and the terminal object, wherein the data value of the role type is unique amongst each role object within the association object.

19. A computer program product for use with a data processing system for implementing a datastore, the computer program product comprising:

a computer usable medium;

first instructions for determining an association for a plurality of generic objects;

second instructions for generating an association object, the association object comprising an association type and an association state; and third instructions for storing the association object and the plurality of generic objects on a computer-readable medium;

a data value for the association type corresponding to a type of the relation to be represented for the plurality of terminal objects;

a data value for the association state corresponding to a state of the relation to be represented for the plurality of terminal objects; and a role object, for each terminal object being related by the association object, that represents a relation between the association object and a terminal object, the role object comprising a data value of a role type corresponding to a type of the relation to be represented between the associated object and the terminal object, wherein the data value of the role type is unique amongst each role object within the association object.

* * * * *

UNITED STATES PATENT AND TRADEMARK OFFICE
CERTIFICATE OF CORRECTION

PATENT NO. : 6,487,556 B1
DATED : November 26, 2002
INVENTOR(S) : Downs et al.

It is certified that error appears in the above-identified patent and that said Letters Patent is hereby corrected as shown below:

Column 9,
Line 46, after "Fig.", delete "5A" and insert -- 8A --.

Column 14,
Line 31, after "of", delete "." and insert -- : -- and begin a new paragraph with "determining".

Signed and Sealed this

Twenty-ninth Day of July, 2003

JAMES E. ROGAN
*Director of the United States Patent and Trademark Office*